3,054,782
ACRYLONITRILE POLYMERS PREPARED IN GRANULAR FORM
Robert Saxon, Stamford, Conn., assignor to American Cyanamid Company, New York, N.Y., a corporation of Maine
No Drawing. Filed June 16, 1958, Ser. No. 742,063
8 Claims. (Cl. 260—80.5)

This invention relates to polymers containing predominant amounts of acrylonitrile and more particularly to a novel method of preparing acrylonitrile polymers in the form of discrete insoluble free-flowing granules.

Polymers of acrylonitrile and copolymers thereof with other ethylenically unsaturated polymerizable compounds are well known. Polymeric materials of this type have achieved wide use in the production of various commercial products such as molding compositions, artificial fibers and synthetic rubber. The present invention is concerned with extending the useful applications of acrylonitrile through the polymerization thereof to produce an insoluble discrete granular material as a direct product of the polymerization reaction.

It is an object of the present invention to provide a novel procedure for the polymerization of acrylonitrile. It is another object of the present invention to provide a novel polyacrylonitrile product in the form of a free-flowing insoluble granular material. The above and other objects of the invention, which will become more apparent as the description of the invention proceeds, are attained by polymerizing acrylonitrile together with a suitable cross-linking agent and a water-insoluble catalyst, all dispersed in an aqueous medium. In the heterogeneous system, the ratio of monomers to water is selected so that there are two liquid phases present during the course of the polymerization. No emulsifying, wetting or dispersing agent is employed in the polymerization according to the present invention.

In a general way, the practice of the invention comprises preparing a heterogeneous polymerization system in which water is the reaction medium and acrylonitrile is the major polymerizable ingredient. Acrylonitrile is introduced with stirring into the reaction medium and is present in amounts of at least 60% by weight based on the total weight polymerizable material and preferably is present in amounts of at least 70%. A cross-linking agent having at least 2 vinyl non-conjugate linkages is copolymerized with the acrylonitrile and may be present in amounts of from about 3% to as high as 40%, when acrylonitrile is the only other polymerizable compound, but is preferably employed in amounts of from about 5% to about 20%. As polymerization catalyst, water-insoluble organic materials of the group consisting of azo compounds having at least 4 carbon atoms per azo nitrogen and water-insoluble organic peroxides and hydroperoxides of carboxylic acids having at least 4 carbon atoms are employed in amounts within the range of from about 0.05 to about 10%, based on the weight of monomers. The reaction is preferably conducted under an inert atmosphere; accordingly, the air in the free space is preferably displaced by, and the reaction is maintained under, inert gas such as carbon dioxide. The temperature of the reaction mixture is raised preferably to within the range of from 50° to 90° C., although somewhat less practical temperatures of from about 30° C. to reflux, and even higher when pressure is applied, may be utilized. It is important that the batch be agitated during the polymerization so as to disperse droplets of the monomers throughout the aqueous reaction medium. The polymer as it forms is produced as a substantially uniformly granular material having a mesh size in excess of about 20 as distinguished from the conventional finely divided powdery product obtained by emulsion polymerization systems and those systems wherein an inorganic or water-soluble catalyst is employed. Furthermore, the granules are relatively resistant to powdering during further processing. The granular product may be washed, although this is not necessary inasmuch as it is in a remarkably high state of purity as formed, and recovered from the reaction medium.

The invention will be described in greater detail in conjunciton with the following examples in which the stated proportions are given as parts by weight unless noted otherwise.

EXAMPLE 1

Into a suitable reaction vessel equipped with mechanical agitator, thermometer, inlet and outlet means, inert gas inlet and condenser is introduced 1000 parts of water. The water is heated to 64° C. The vessel is purged with carbon dioxide and a slow stream thereof is bubbled through the aqueous medium through the reaction. The agitator is operated and over a period of 5 hours, 360 parts of acrylonitrile, 73 parts of divinyl benzene and 2 parts of azo-bis(isobutyronitrile), available commercially under the name of Porofor N, together with an additional 2000 parts of water are introduced into the reaction mixture. The temperatures rises slowly from 64 to 78° and a slight reflux is noted as the batch reaches 74° C. Polymer granules begin to form about 50 minutes after commencement of the reaction. After completion of the additions, the reaction mixture is subjected to distillation until cessation of the appearance of oil in the distillate. The granular polymer is filtered, washed with water and dried at 110–120° C. for 30 minutes. The yield is 370 parts of which less than 10% is finer than 20 mesh. Nitrogen content, upon analysis of the product, is 20.77%, corresponding to 81% acrylonitrile.

EXAMPLE 2

The procedure employed in Example 1 is repeated in essence with the following exception. An initial charge of 500 parts and a total amount of 2000 parts of water is employed. 2 parts of Porofor N, azo-bis(isobutyronitrile) and a total of 320 parts of acrylonitrile are added. The cross-linking agent is 80 parts of methylenebisacrylamide. Introduction of the reactants is made in ten equal increments comprising 32 parts of acrylonitrile containing dissolved therein 0.2 part of azo-bis(isobutyronitrile); 8 parts of methylenebisacrylamide and 50 parts of water at intervals of 20 minutes. The temperature is allowed to rise slowly to reflux (about 72° C.). There is an induction period of one hour followed by rapid formation of granular polymer. The remaining 1000 parts of water are introduced 3½ hours after the addition of the first increment and heating is continued at 72° C. for an additional one-half hour. The polymer is filtered, washed with water and dried. 382 parts (96%) of a creamy white granular product is obtained. More than 95% of the product is coarser than 20 mesh.

EXAMPLE 3

Example 2 is substantially repeated with the exception that 40 parts of methylenebisacrylamide, instead of 80 parts are employed, the remaining quantity for 100 parts of monomeric charge being replaced by 40 parts of methyl styrene (vinyl toluene). The reactants are introduced in two separated streams comprising the monomeric materials acrylonitrile and methyl styrene containing azo-bis(isobutyronitrile) catalyst dissolved therein as the first stream, and a second stream comprising the 40 parts of methylenebisacrylamide with 1800 parts of water. The mixture is introduced into the reactor, the contents of which are stirred vigorously and held at 75° C. for 3 hours, the period during which the streams are fed to the vessel at proportionate rates. After this period, stirring is continued at 75° C. for 30 minutes, then the temperature is raised to 88° C. and stirring continued for 30 minutes more. The granular polymer is filtered, washed with water, and dried for one hour at 120° C. Yield is 370 parts (93%) of which 340 parts or 92% comprise particles larger than 20 mesh.

EXAMPLES 4–10

The procedure of Example 1 is repeated employing a total of 3000 parts of water in the polymerization of the systems, with results set forth in Table 1.

of the monomers, as well as on the prevailing temperature conditions. The proportion of water must be kept low enough so that the monomer is not dissolved therein but is present as a separate and distinct phase.

The polymeric material produced by the hereindescribed method includes granular polymers wherein mono-vinyl compounds are optionally copolymerized with acrylonitrile and a cross-linking agent of the group which will be described in detail. In general, the percentage of copolymerizable ingredients based on total monomers which may be employed to give heterogeneous mixtures may be as high as about 40%, at most, specifically about Table I

| Example | Monomer(s) | Percent By Weight | Cross-Linking Agent | Percent By Weight | Catalyst | Percent Based on Total Monomers | Yield of Polymer, Percent | Percent Product Coarser Than 20 Mesh |
|---|---|---|---|---|---|---|---|---|
| 4 | Acrylonitrile<br>Methyl Methacrylate | 75<br>15 | Ethylene diacrylate | 10 | Tertiary Butyl Hydroperoxide | 0.5 | 89 | 93 |
| 5 | Acrylonitrile<br>Styrene | 70<br>15 | Divinyl Benzene | 15 | Cumene Hydroperoxide | 0.4 | 90 | 92 |
| 6 | Acrylonitrile | 85 | Ethylene Dimethacrylate | 15 | 1,1-azo-bis(1-phenylethane) | 1.5 | 91 | 91 |
| 7 | Acrylonitrile<br>Vinylidene Chloride | 80<br>15 | Methylene Bisacrylamide | 5 | Azo-bis(diphenylmethane) | 0.4 | 93 | 92 |
| 8 | Acrylonitrile<br>Methacrylonitrile<br>Methyl Styrene | 70<br>10<br>10 | Diallyl Phthalate | 10 | Azo-bis (isobutyronitrile) | 2.0 | 89 | 94 |
| 9 | Acrylonitrile<br>Methyl Isopropenyl Ketone | 75<br>10 | 2,2,5,5-Tetramethyl-1,5-hexadiene | 15 | Azo-bis-1-(2-furyl)ethane | 0.3 | 92 | 93 |
| 10 | Acrylonitrile<br>Vinyl Stearate | 75<br>15 | Diallyl Acrylate | 10 | Azo-bis-α-(2-furyl)phenylmethane | 0.3 | 89 | 92 |

As noted hereinabove, the invention is best adapted to the polymerization and/or copolymerization of acrylonitrile with minor proportions of other polymerizable compounds having a single ethylenically unsaturated $CH_2=C<$ grouping, together with a minor amount of a cross-linking agent having at least two ethylenically unsaturated groups. Analogs of acrylonitrile such as α-methacrylonitrile, α-ethacrylonitrile, α-phenylacrylonitrile and α-chloroacrylonitrile are also polymerizable in accordance with the invention and the polymerization acrylonitrile as herein contemplated is to be considered as generic to the polymerization of nitriles of acrylic acid and its analogs. Each of these nitrile compounds is characterized by relatively low solubility in water and are thus particularly suitable in the preparation of the granular product with which the invention is concerned.

As noted in the examples hereinabove, the process may also be advantageously used to produce copolymers of acrylonitrile with minor proportions, i.e., less than 40%, of other polymerizable or copolymerizable compounds having appreciable insolubility in water such as butyl methacrylate, octyl methacrylate, 2-nitro-2-methyl propyl methacrylate, methoxyethyl methacrylate, chloroethyl methacrylate, phenyl methacrylate, cyclohexyl methacrylate, dimethyl aminoethyl methacrylate, and the corresponding esters of acrylic or alpha-chloroacrylic acids; unsaturated ketones such as methyl vinyl ketone, phenyl vinyl ketone, and methyl isopropenyl ketone, vinylidene chloride, vinyl chloride, vinyl fluoride, vinyl stearate, derivatives of unsaturated dicarboxylic acids such as fumaric, maleic, citraconic, mesaconic, or cyclohexene dicarboxylic esters, N-alkyl maleimides; N-vinyl carbazole, N-vinyl succinimide, N-vinyl phthalimide; vinyl ethers, mono-olefins or substitution products thereof such as styrene, methyl styrene, dimethyl styrene, halogen substituted styrenes, e.g., chloro styrene, α-bromo methyl styrene, furyl ethylene, isobutylene, and the like.

The amount of water which is present or employable in making up the reaction mixture must be controlled in practicing the present invention. The quantity of water which is used depends upon the solubility characteristics 37% when allowing a minimum of about 3% for the cross-linking agent. The upper limit may be reached with highly water-insoluble monomers, such as styrene, methyl methacrylate and vinylidene chloride. Moderately soluble monomers, such as vinyl acetate, methyl acrylate, and methyl vinyl ketone are preferably present in amounts not exceeding 15% of the total monomer mixture.

The cross-linking agents which may be present in amounts of as high as 40%, when it is combined with acrylonitrile as the sole other polymerizable compound, and may be any one of various known compounds or mixtures thereof containing more than one vinyl group (other than compounds containing a normal conjugated double bond arrangement such as 1,3-butadiene). Suitable compounds of this type containing at least two ethylenically unsaturated non-conjugated double bonds are such as methylenebisacrylamide, divinyl benzene, diallyl ether, ethylene diacrylate, 2,2,5,5-tetramethyl-1,5-hexadiene, ethylene dimethacrylate, and various allyl esters of dibasic acids, e.g., diallyl phthalate, diallyl succinate, diallyl maleate, diallyl carbonate, triallyl phosphate, triallyl citrate, and the like.

In selecting a polymerization catalyst for use in the present invention, it is essential that such compounds be substantially water-insoluble. Suitable catalysts which have found utility are organic peroxides and hydroperoxides of acids having at least 4 carbon atoms, and azo compounds having the formula:

$$R^3—CHR^1—N=N—CHR^2—R^4$$

wherein $R^1$ and $R^2$ are substituents selected from the group consisting of alkyl radicals having at least 3 carbon atoms, and aralkyl radicals, and $R^3$ and $R^4$ are substituents selected from the group consisting of hydrogen, alkyl radicals preferably those containing up to 20 carbon atoms, phenyl radicals, aralkyl radicals, alkoxy radicals, furyl radicals and halogen substituted radicals of said group. Illustrative specific examples of such compounds are cumene hydroperoxide, tertiary-butyl hydroperoxide, ditertiary-butyl peroxide, toluyl hydroperoxide, benzoyl peroxide, p-promobenzoyl hydroperoxide, succinyl peroxide, pinane hydroperoxide, acetyl peroxide, p-methane hydroperoxide, methyl ethyl ketone peroxide, diisopropylbenzene hydroperoxide, anisoyl peroxide, 1-cyclohexanol-1-hydroperoxide, furoyl peroxide, and the like. Suitable illustrative examples of azo catalysts are such as azo-bis(isobutyronitrile), azo-bis(diphenyl methane), 1,1-azo-bis(1-phenyl ethane), 1,1′-azo-bis(1-phenyl hexane), azo-bis(naphthylcyclohexyl methane), azo-bis(ditolyl ethane), 1,1-azo-bis(chlorophenyl ethane), 1,1-azo-bis(dimethoxyphenyl methane), azo-bis-1-(2-furyl)isobutane, azo-bis-α-(2-furyl)chlorophenyl ethane, azo-bis-α-(2-furyl)toluyl ethane and the like. Organic redox catalyst systems such as the benzoyl peroxide-dimethyl aniline system may also be employed. The amount of catalyst may vary over a fairly wide range. Thus, from about 0.05% to about 10% by weight based on the total weight of the polymerizable compounds may be used and generally amounts of from about 0.2% to about 3% by weight are preferred as a practical matter.

The addition of the catalyst to the reaction mixture is frequently attended by a marked increase in temperature and care must be taken to remove the excessive heat generated in such cases. The total quantity of catalyst may be added initially to the reaction mixture or in small proportions during the course of polymerization. The latter method affords a convenient procedure for regulating the amount of heat produced in a given time.

The invention may also be carried out in alkaline, acid or neutral media. However, it is preferred to operate in an aqueous medium whose pH may vary from about 2 to about 8 since this range appears to enhance the polymerization of acrylonitrile. In copolymerizations the selection of the pH will be governed to a considerable degree by the nature of the monomer which is conjointly polymerized with acrylonitrile. If it is desired to avoid pH changes during the course of the polymerization, suitable buffers may be added to the aqueous medium.

The present process permits successful operation at temperatures as low as room temperature when appropriate catalyst systems (such as benzoyl peroxide plus dimethylamine) are used. However, it is preferred to operate in the range of about 50–90° C. The process is eminently suited for continuous operation when it is carried out near the upper limit of this temperature range. Although the range of 50–90° C. is indicated as preferred, temperatures up to 95° C. and even in excess of 100° C. may also be employed if suitable pressure equipment is used. Pressure equipment may also be desirable where extremely volatile comonomers, such as isobutylene, are employed.

While acrylonitrile is not as susceptible to the inhibiting effect of oxygen as are many other polymerizable compounds, it is nevertheless advantageous to conduct the polymerization in the absence of air. The air may be displaced from the polymerization vessel by means of an inert gas which does not reduce the rate of polymerization. Suitable illustrative gases therefor are well known in the art and include nitrogen, carbon dioxide, methane and helium, and the like.

The products of this invention after polymerization are uniform granular particles of a size appreciably, and fairly uniformly, coarser than 20 mesh. After the polymerization has been concluded, the mixture is filtered or centrifuged, and washed with water to remove traces of electrolyte which may adhere to the particles. In order to facilitate the low temperature drying of the polymers, it may be beneficial to employ a final wash with a lower aliphatic alcohol such as methanol or ethanol, or with acetone.

The product prepared according to the present invention may be employed for a variety of useful purposes. In particular, because of their unique properties and physical form, they are useful as intermediates in the formation of ion exchange resins. In the preparation of such resins, as is well known by those versed in the art, the insoluble resinous intermediate is treated for example with a variety of compounds containing amino groups or the intermediate may be subjected to hydrolysis or sulfonation.

I claim:

1. A method of making an insoluble, discrete, granular, polymeric product which comprises polymerizing at least 60%, by weight, of monomeric acrylonitrile, not more than 40%, by weight, of a substantially water-insoluble monomer containing an unsaturated polymerizable $CH_2=C<$ group and at least 3%, by weight of the total monomers, of a polymerizable cross-linking agent containing at least two ethylenically unsaturated non-conjugated linkages, at a temperature of from about 30° C. to reflux, in a liquid two-phase aqueous medium, containing an amount of water insufficient to substantially solubilize the monomers, and in the presence of from about 0.5% to about 10%, based on the total weight of monomers, of a water-insoluble polymerizable catalyst selected from the group consisting of (1) aliphatic azo compounds having the formula $$R^3—CHR^1—N=N—CHR^2—R^4$$

wherein $R^1$ and $R^2$ are substituents selected from the group consisting of alkyl radicals having at least three carbon atoms and aralkyl radicals, and $R^3$ and $R^4$ are substituents selected from the group consisting of hydrogen, alkyl, phenyl, aralkyl, alkoxy and furyl radicals and halogen substituted radicals of said last-mentioned group and (2) peroxides and hydroperoxides of organic acids having at least four carbon atoms, while continuously forming and maintaining droplets of the monomers throughout the reaction medium by continuously agitating said medium, thereby forming granular, polymeric particles, at least 90% of which, as they form, have a uniform granular mesh size in excess of 20 mesh.

2. A method of making an insoluble, discrete, granular, polymeric product which comprises polymerizing acrylonitrile together with at least 3%, by weight of the total acrylonitrile, of a polymerizable cross-linking agent containing at least two ethylenically unsaturated non-conjugated linkages, at a temperature of from about 30° C. to reflux, in a liquid two-phase aqueous medium, containing an amount of water insufficient to substantially solubilize the monomer, and in the presence of from about 0.5% to about 10%, based on the total weight of monomer, of a water-insoluble polymerization catalyst selected from the group consisting of (1) aliphatic azo compounds having the formula $$R^3—CHR^1—N=N—CHR^2—R^4$$

wherein $R^1$ and $R^2$ are substituents selected from the group consisting of alkyl radicals having at least three carbon atoms and aralkyl radicals, and $R^3$ and $R^4$ are substituents selected from the group consisting of hydrogen, alkyl, phenyl, aralkyl, alkoxy and furyl radicals and halogen substituted radicals of said last-mentioned group and (2) peroxides and hydroperoxides of organic acids having at least four carbon atoms, while continuously forming and maintaining droplets of the monomer throughout the reaction medium by continuously agitating said medium, thereby forming granular, polymeric particles, at least 90% of which, as they form, have a uniform granular mesh size in excess of 20 mesh.

3. A method of making an insoluble, discrete, granular, polymeric product which comprises polymerizing at least 60%, by weight, of monomeric acrylonitrile, not more than 40%, by weight, of methyl styrene and at least 3%, by weight of the total monomers, of a polymerizable cross-linking agent containing at least two ethylenically unsaturated non-conjugated linkages, at a temperature of from about 30° C. to reflux, in a liquid two-phase aqueous medium, containing an amount of water insufficient to substantially solubilize the monomers, and in the presence of from about 0.5% to about 10%, based on the total weight of monomers, of a water-insoluble polymerization catalyst selected from the group consisting of (1) aliphatic azo compounds having the formula $$R^3—CHR^1—N=N—CHR^2—R^4$$

wherein $R^1$ and $R^2$ are substituents selected from the group consisting of alkyl radicals having at least three carbon atoms and aralkyl radicals, and $R^3$ and $R^4$ are substituents selected from the group consisting of hydrogen, alkyl, phenyl, aralkyl, alkoxy and furyl radicals and halogen substituted radicals of said last-mentioned group and (2) peroxides and hydroperoxides of organic acids having at least four carbon atoms, while continuously forming and maintaining droplets of the monomers throughout the reaction medium by continuously agitating said medium, thereby forming granular, polymeric particles, at least 90% of which, as they form, have a uniform granular mesh size in excess of 20 mesh.

4. A method of making an insoluble, discrete, granular, polymeric product which comprises polymerizing monomeric acrylonitrile and at least 3%, by weight of the total monomer, of methylenebisacrylamide at a temperature of from about 30° C. to reflux, in a liquid two-phase aqueous medium, containing an amount of water insufficient to substantially solubilize the monomers, and in the presence of from about 0.5% to about 10%, based on the total weight of monomers, of a water-insoluble polymerization catalyst selected from this group consisting of (1) aliphatic azo compounds having the formula $$R^3—CHR^1—N=N—CHR^2—R^4$$

wherein $R^1$ and $R^2$ are substituents selected from the group consisting of alkyl radicals having at least three carbon atoms and aralkyl radicals, and $R^3$ and $R^4$ are substituents selected from the group consisting of hydrogen, alkyl, phenyl, aralkyl, alkoxy, and furyl radicals and halogen substituted radicals of said last-mentioned group and (2) peroxides and hydroperoxides of organic acids having at least four carbon atoms, while continuously forming and maintaining droplets of the monomers throughout the reaction medium by continuously agitating said medium, thereby forming granular, polymeric particles, at least 90% of which, as they form, have a uniform granular mesh size in excess of 20 mesh.

5. A method of making an insoluble discrete, granular, polymeric product which comprises polymerizing monomeric acrylonitrile and at least 3%, by weight of the total monomer, of a divinyl benzene, at a temperature of from about 30° C. to reflux, in a liquid two-phase aqueous medium, containing an amount of water insufficient to substantially solubilize the monomers, and in the presence of from about 0.5% to about 10%, based on the total weight of monomers, of a water-insoluble polymerization catalyst selected from the group consisting of (1) aliphatic azo compounds having the formula $$R^3—CHR^1—N=N—CHR^2—R^4$$

wherein $R^1$ and $R^2$ are substituents selected from the group consisting of alkyl radicals having at least three carbon atoms and aralkyl radicals, and $R^3$ and $R^4$ are substituents selected from the group consisting of hydrogen, alkyl, phenyl, aralkyl, alkoxy and furyl radicals and halogen substituted radicals of said last-mentioned group and (2) peroxides and hydroperoxides of organic acids having at least four carbon atoms, while continuously forming and maintaining droplets of the monomers throughout the reaction medium by continuously agitating said medium, thereby forming granular, polymeric particles, at least 90% of which, as they form, have a uniform granular mesh size in excess of 20 mesh.

6. A method of making an insoluble, discrete, granular, polymeric product which comprises polymerizing monomeric acrylonitrile with at least 3% by weight, based on the total weight of monomeric acrylonitrile, of methylenebisacrylamide, at a temperature of from about 30° C. to reflux, in a liquid two-phase aqueous medium, containing an amount of water insufficient to substantially solubilize the monomers, and in the presence of from about 0.5% to about 10%, based on the total weight of monomers, of azo-bis(isobutyronitrile), while continuously forming and maintaining droplets of the monomers throughout the reaction medium by continuously agitating said medium, thereby forming granular, polymeric particles, at least 90% of which, as they form, have a uniform granular mesh size in excess of 20 mesh.

7. A method of making an insoluble, discrete, granular, polymeric product which comprises polymerizing monomeric acrylonitrile with at least 3% by weight, based on the total weight of monomeric acrylonitrile, of a divinyl benzene, at a temperature of from about 30° C. to reflux, in a liquid two-phase aqueous medium, containing an amount of water insufficient to substantially solubilize the monomers, and in the presence of from about 0.5% to about 10%, based on the total weight of monomers, of azo-bis(isobutyronitrile), while continuously forming and maintaining droplets of the monomer throughout the reaction medium by continuously agitating said medium, thereby forming granular, polymeric particles, at least 90% of which, as they form, have a uniform granular mesh size in excess of 20 mesh.

8. A method of making an insoluble, discrete, granular, polymeric product which comprises polymerizing at least 60%, by weight, of monomeric acrylonitrile, not more than 40%, by weight, of methyl methacrylate and at least 3%, by weight of the total monomers, of a polymerizable cross-linking agent containing at least two ethylenically unsaturated non-conjugated linkages, at a temperature of from about 30° C. to reflux, in a liquid two-phase aqueous medium, containing an amount of water insufficient to substantially solubilize the monomers, and in the presence of from about 0.5% to about 10%, based on the total weight of monomers, of azobisisobutyronitrile, while continuously forming and maintaining droplets of the monomers throughout the reaction medium by continuously agitating said medium, thereby forming granular polymeric particles, at least 90% of which, as they form, have a uniform granular mesh size in excess of 20 mesh.

References Cited in the file of this patent
UNITED STATES PATENTS

| | | |
|---|---|---|
| 2,475,846 | Lundberg | July 12, 1949 |
| 2,718,515 | Thomas | Sept. 20, 1955 |
| 2,840,550 | Price et al. | June 24, 1958 |
| 2,885,371 | Tavani | May 5, 1959 |